Sept. 1, 1942.　　　L. E. GARFIELD　　　2,294,544
CUTTER TEETH FOR WELL DRILLS
Filed Aug. 15, 1940　　　2 Sheets-Sheet 2

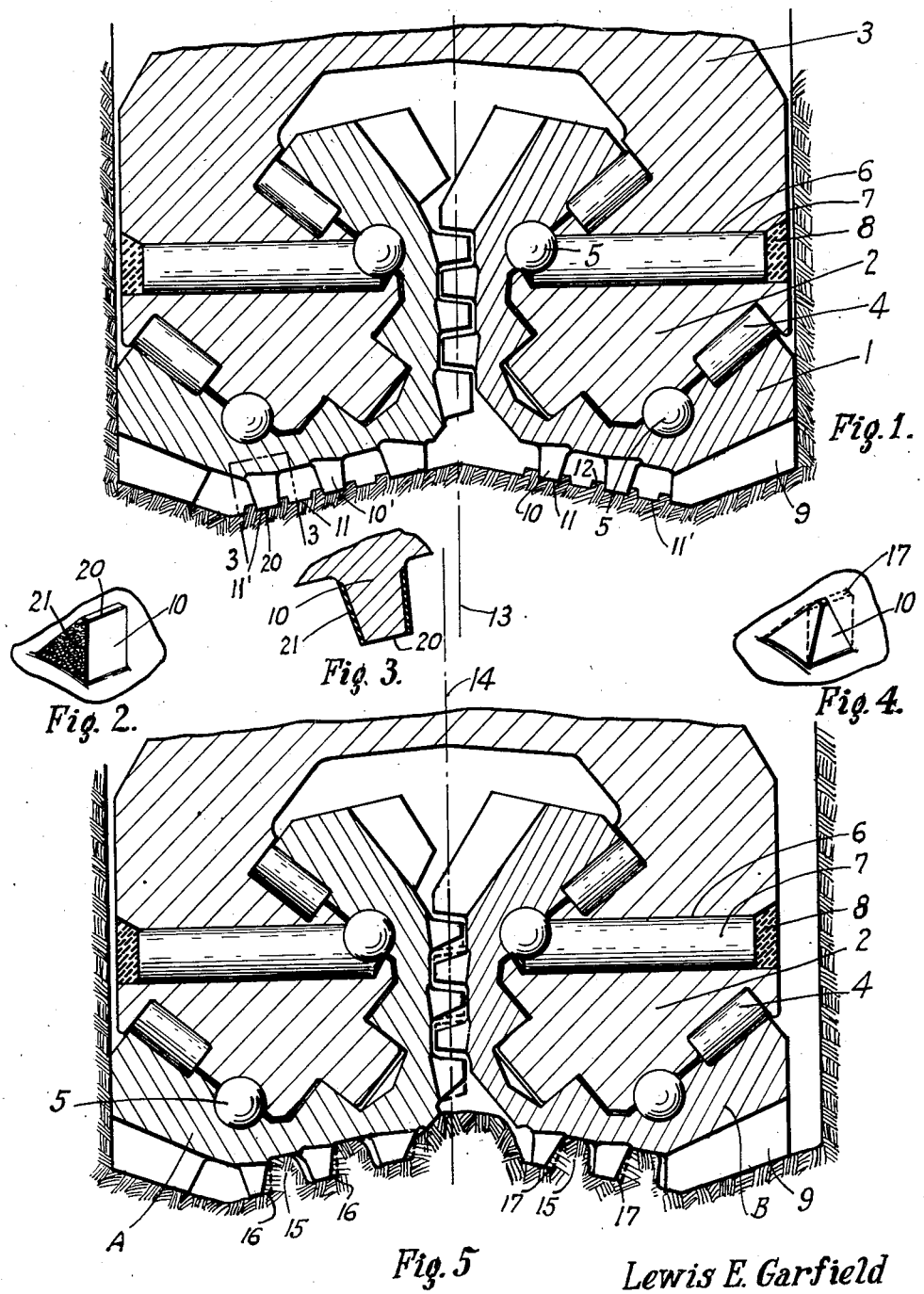

Lewis E. Garfield
INVENTOR

BY Jesse P. Stone
ATTORNEY

Patented Sept. 1, 1942

2,294,544

UNITED STATES PATENT OFFICE 2,294,544

CUTTER TEETH FOR WELL DRILLS

Lewis E. Garfield, Houston, Tex., assignor to Hughes Tool Company, Houston, Tex., a corporation of Delaware Application August 15, 1940, Serial No. 352,713

1 Claim. (Cl. 255—71)

My invention relates to well drills of the roller cutter type employed in drilling deep wells, and particularly in hard formation.

The invention is concerned particularly with the formation of the teeth upon the cutters and the manner in which the teeth are hard faced to avoid wear.

In some formations the corresponding rows of teeth upon two or more cutters tend to fall into the same track upon bottom and thus give a wabbling action to the drill upon the bottom. This, as will be later described, tends to wear the adjacent sides of the rows of teeth upon the cutters.

It is an object of the invention to so form the teeth that the said teeth will not wear excessively on the sides of the rows when the drill is in the off-center position which it tends to take.

The invention will be better understood by reference to the drawings herewith wherein Fig. 1 is a central vertical section through the lower end of a drill bit showing cutters mounted thereon and cutting the bottom of the hole in a normal manner.

Fig. 2 is a perspective view of a cutter tooth such as is employed upon the Fig. 1 embodiment.

Fig. 3 is a broken transverse longitudinal section through one of the teeth of the cutters taken approximately on the line 3—3 of Fig. 1.

Fig. 4 is a perspective view of a worm cutter tooth.

Fig. 5 is a longitudinal sectional view similar to Fig. 1 and showing the manner in which the teeth upon the cutters of a two-cone bit are constrained to track in the same grooves cut by the adjacent cutter.

Figure 6:
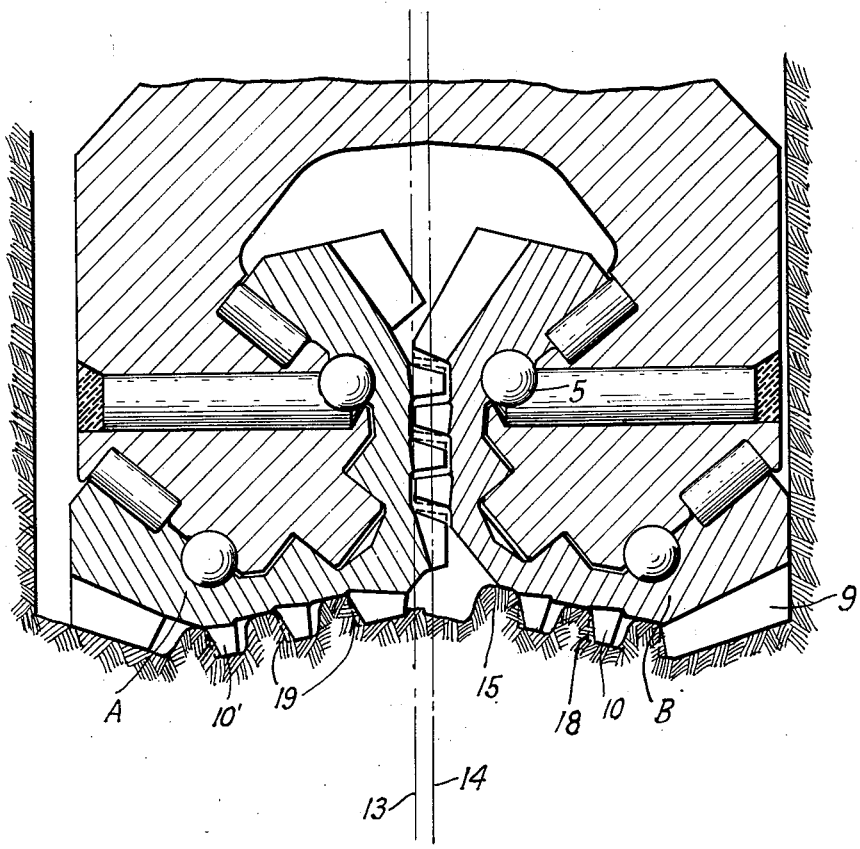
Fig. 6 is view similar to Fig. 5 but showing the cutter moved in a direction the opposite to that shown in Fig. 5.

The cutters for which my invention is particularly adapted are approximately conical shaped cutters 1, mounted upon the shafts 2 of the drill head 3. These cutters surround the ends of the shafts 2 and are rotatable on said shafts as the cutters roll upon the bottom of the hole. Antifriction rows of rollers 4 and balls 5 assist the cutter in its free rotation upon the shaft. The rows of balls 5 act to retain the cutters upon the shafts, said balls being introduced through openings 6 after the cutters are mounted upon the shaft and a plug 7 is inserted in each of these openings to hold the balls in the raceway, said plug being welded at 8 to secure it in position.

Each cutter has a row of teeth 9 adjacent the base of the cone and a plurality of rows of teeth 10 between the base or the heel row and the apex of the cone.

When a drill bit having two cutters, such as is illustrated in Fig. 1, is rotated through the rotation of the drill stem to cause the cutters to roll upon the bottom of the hole, the teeth upon the cutters will normally cut separate tracks upon the bottom. As will be noted the rows of teeth upon one cutter are offset relative to the rows of teeth on the adjacent cutter, so that as the cutters rotate the rows of teeth on one will tend to engage between the rows of teeth on the adjacent cutter. This offsetting of the rows of teeth on one cone relative to those on the other causes the teeth shown in Fig. 1 to cut grooves 11 on the bottom, while the teeth 10' on the adjacent cutter will cut grooves 11' on the bottom. Between these grooves cut by the two cutters are ridges of material shown at 12, which are untouched by the teeth but which break off in the cutting of the bottom of the hole.

When the cutter rotates in the manner shown in Fig. 1 the cutters describe circles about an axis 13 indicated by the dotted line. However, when certain formations are encountered by the bit, and particularly certain tough shale or rubbery formations, the rows of teeth on one cutter tend to track in the grooves cut by the teeth on the adjacent cutter. In order to do this the axis of rotation of the drill is eccentric to the original axis, as shown at 14 in Fig. 5. This axis, however, is a gyratory or wabbling axis which moves in a circle about the axis 13 of the bit in its normal rotation. By moving this axis to one side and giving a gyratory motion to the bit the rows of teeth on one cutter may engage in the same grooves as the rows of teeth on the other, as illustrated in Fig. 5. When this is done, ridges of uncut bottom, indicated at 15, grow up on the bottom of the hole, tending to slow down the progress of the bit.

With reference to Fig. 5, it will be seen that the rows of teeth on the cutter A are crowded to a position slightly outside of their normal position so that the heel teeth on cutter A cut the side wall of the hole and the inner sides of the rows of teeth on the cutter A will be worn away. The dotted line 16 in this view shows the original size of the tooth, the ends of the teeth in each row being worn away on their inner sides. The result of this action of the drill is to produce a hole oversized relative to that of the drill size.

In the cutter B the reverse is true. This cutter is also pushed to the left so that the outer side is worn away by the ridges 15, as indicated by the dotted lines 17 on the cutter.

In Fig. 6 the drill bit has been forced by the action of the formation to the opposite side and it will be noted that when this is done the axis 14 upon which the cutter rotates is moved to one side of the axis of the hole 13. In this position the teeth upon the cutter B are crowded outwardly from their normal position, so that the heel teeth on cutter B cut the wall of the hole, and are thus worn on the inner side 18, as seen in the drawings. The teeth upon the cutter A, however, are crowded inwardly from their normal line of rotation and are thus worn on the outer sides, as indicated at 19. When the drill rotates in this eccentric manner a hole of larger diameter, which is oversize relative to the diameter of the bit employed, is formed.

Thus the teeth on one cutter will wear on the inner side while the teeth on the adjacent cutter will wear on the outer side, and the teeth are gradually made narrower until, after some period of drilling, they come to a point along the crest which ordinarily would have an optimum width, as shown in Figs. 1 and 3. The shape of the tooth when thus worn is indicated generally in Fig. 4 where the worn tooth 10 is approximately pyramidal in form while it was originally the form indicated by the dotted lines 17.

As there is a tendency of the bit to again rotate on a normal axis concentric to the hole when the drill has cut through the rubbery formation which tends to cause it to rotate in a gyratory manner, it will then cut the hole in a normal manner, and, if the teeth have not been unduly worn in going through the rubbery formation, the drill will again rotate concentrically in the hole. If, however, the teeth have been unduly worn as described, the drill will continue to operate in a gyratory manner regardless of the formation and the ridges 15 on bottom will strongly impede the progress of the drill.

This difficulty in drilling with well drills of this character is one which has existed for some time and has been a source of trouble for many years. I overcome this difficulty to a large extent by placing hard facing material upon both sides of the teeth in the rows. The teeth are normally formed with a cutting crest 20 thereon approximately the full width of the teeth in the row. The sides of the teeth at the ends of the crest I cover with a layer of granules of hard material, such as tungsten carbide. These layers 21 are of appreciable thickness and resist any tendency of the ridges 15 on the bottom of the hole to wear the sides of the teeth in the adjacent rows. Thus when the cutters tend to move to one side of the normal axis of rotation of the drill and wear the sides of the rows of teeth, the teeth will not be quickly worn but will withstand the wear due to the gyratory motion of the bit; and, when the particularly rubbery formation has been passed through, the drill will again assume its position concentrically in the hole, as shown in Fig. 1, and, as the teeth on the cutters have not been worn on the sides covered by the hard facing material the drill may again function in the normal manner without wabbling or gyratory action. The ridges 15 which tend to grow on the bottom will be broken away and the progress of the bit will be unimpeded by said ridges. As the ends of the teeth do not become materially worn when hard faced, the crests of the teeth maintain their length and the speed of drilling is thus not slowed down.

The hard facing material may be placed at the sides of the teeth in the row by any desirable method. Normally it may be deposited by a welding torch or by the electric arc by the use of a welding rod, but the manner in which the hard facing is applied is not a material feature of the invention.

What I claim is:

In a well drill, a plurality of cutters mounted to rotate thereon, and circumferential rows of chisel shaped teeth on said cutters, crests on said teeth extending longitudinally of the cutter, the rows of teeth on each cutter mounted to cut a separate track on the well bottom, said teeth being formed with relatively more abrasion resistant material on the outward and inward sides thereof.

LEWIS E. GARFIELD.